(12) United States Patent
Mori

(10) Patent No.: US 8,496,743 B2
(45) Date of Patent: Jul. 30, 2013

(54) INK COMPOSITION

(75) Inventor: Shuhei Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 307 days.

(21) Appl. No.: 13/051,085

(22) Filed: Mar. 18, 2011

(65) Prior Publication Data

US 2011/0229648 A1    Sep. 22, 2011

(30) Foreign Application Priority Data

Mar. 18, 2010  (JP) .................................. 2010-062987
Mar. 18, 2010  (JP) .................................. 2010-062996

(51) Int. Cl.
  *C09D 11/02*    (2006.01)

(52) U.S. Cl.
  USPC ..................................... 106/31.45; 106/31.48

(58) Field of Classification Search
  USPC .............. 106/31.45, 31.48; 427/256; 347/100
  See application file for complete search history.

(56) References Cited

U.S. PATENT DOCUMENTS

| | | | |
|---|---|---|---|
| 5,681,381 A | 10/1997 | Auslander et al. | |
| 6,203,604 B1 * | 3/2001 | Kashiwazaki et al. | 106/31.5 |
| 6,508,871 B1 * | 1/2003 | Kato et al. | 106/31.27 |
| 6,835,239 B2 * | 12/2004 | Hakamada et al. | 106/31.48 |
| 6,929,687 B2 * | 8/2005 | Wachi | 106/31.48 |
| 7,060,123 B2 * | 6/2006 | Hakamada et al. | 106/31.48 |
| 7,125,445 B2 * | 10/2006 | Chou et al. | 106/31.48 |
| 7,144,449 B2 * | 12/2006 | Udagawa et al. | 106/31.15 |
| 7,153,332 B2 * | 12/2006 | Hasemann | 106/31.48 |
| 7,267,716 B2 * | 9/2007 | Nagashima et al. | 106/31.6 |
| 7,316,739 B2 * | 1/2008 | Taguchi et al. | 106/31.48 |
| 7,404,851 B2 * | 7/2008 | Arai | 106/31.48 |
| 7,416,592 B2 * | 8/2008 | Kitamura et al. | 106/31.48 |
| 7,429,291 B2 * | 9/2008 | Udagawa et al. | 106/31.15 |
| 7,435,292 B2 * | 10/2008 | Hanmura et al. | 106/31.48 |
| 7,789,954 B2 * | 9/2010 | Mori | 106/31.32 |
| 7,819,961 B2 * | 10/2010 | Wright | 106/31.48 |
| 2006/0009357 A1 * | 1/2006 | Fujiwara et al. | 503/227 |
| 2007/0151479 A1 * | 7/2007 | Hasemann | 106/31.48 |
| 2009/0256547 A1 | 10/2009 | Akyildiz et al. | |
| 2009/0260540 A1 | 10/2009 | Mori | |
| 2010/0255275 A1 * | 10/2010 | Wright et al. | 106/31.45 |

FOREIGN PATENT DOCUMENTS

| | | |
|---|---|---|
| JP | 9-291246 A | 11/1997 |
| JP | 2006-131667 A | 5/2006 |
| JP | 2009-256544 A | 11/2009 |
| JP | 2009-256547 A | 11/2009 |
| JP | 2009256541 A * | 11/2009 |
| JP | 2009256543 A * | 11/2009 |
| JP | 2009256544 A * | 11/2009 |
| JP | 2009256546 A * | 11/2009 |
| JP | 2009256547 A * | 11/2009 |

* cited by examiner

*Primary Examiner* — Helene Klemanski

(74) *Attorney, Agent, or Firm* — Nutter McClennen & Fish LLP; John J. Penny, V.

(57) ABSTRACT

By using an ink composition which contains C.I. Acid Red 52, C.I. Acid Red 92, and a specific dye at a ratio in a specific range, it is possible to provide recorded matter having good lightfastness without impairing fluorescence intensity and color developability.

11 Claims, No Drawings

INK COMPOSITION

BACKGROUND

1. Technical Field

The present invention relates to an ink composition containing a fluorescent dye and an ink jet recording method using the same.

2. Related Art

In postage meters for printing postage or postal indicia, red fluorescent ink has been used. In particular, in North America, red fluorescent ink that can be read by automatic readers used by the United States Postal Service is designated as ink to be used for postal indicia.

Automatic readers read bar codes and also detect the front and back of pieces of mail at the same time. Consequently, the red fluorescent ink is required to have not only a high optical density in order to improve bar-code reading accuracy, but also a high fluorescence intensity in order to reduce errors in detecting the front and back of pieces of mail to be detected.

JP-A-9-291246 (Patent Document 1) discloses, as a fluorescent ink for metered mail, a red fluorescent ink to which glycol ether has been added as a cosolvent penetrant and which has excellent waterfastness.

Furthermore, JP-A-2006-131667 (Patent Document 2) discloses an aqueous fluorescent ink having good fluorescent color developability in which a water-soluble fluorescent colorant including C.I. Acid Reds 52 and 92 as fluorescent dyes and a pigment dispersion solution including C.I. Pigment Red 122, as a pigment, and the like are used in combination.

However, fluorescent dyes have poor lightfastness, and when another dye or the like is mixed therewith in order to improve lightfastness, the fluorescence intensity may be sharply decreased because of interaction between the fluorescent dyes and the other dye in some cases.

Furthermore, by combining C.I. Direct Yellow 87 with a red fluorescent ink composition including C.I. Acid reds 52 and 92, a red fluorescent ink composition excellent in terms of fluorescence intensity and color developability (optical density) has been provided (refer to JPA-2009-256544: Patent Document 3). However, an ink composition having good lightfastness in which fluorescence intensity and color developability (optical density) are not impaired has been strongly desired.

SUMMARY

The present inventors have found this time that, by formulating an ink composition including at least C.I. Acid Red 52, C.I. Acid Red 92, and a dye represented by the formula (I) below such that the ratio of the total content of C.I. Acid Red 52 and C.I. Acid Red 92 to the content of the anthrapyridone-based dye is in a specific range, it is possible to obtain an ink composition having good lightfastness without impairing fluorescence intensity and color developability.

It has also been found that, by formulating an ink composition including at least C.I. Acid Red 52, C.I. Acid Red 92, C.I. Direct Yellow 87, and the dye represented by the formula (I) below such that the total content of C.I. Acid Red 52, C.I. Acid Red 92, and C.I. Direct Yellow 87 to the content of the anthrapyridone-based dye is in a specific range, it is possible to obtain an ink composition having good lightfastness without impairing fluorescence intensity and color developability. The invention has been achieved on the basis of these findings.

An advantage of some aspects of the invention is that the invention provides an ink composition which can result in recorded matter having good lightfastness without impairing fluorescence intensity and color developability.

According to a first aspect of the invention, an ink composition includes at least C.I. Acid Red 52, C.I. Acid Red 92, and a dye represented by the formula (I) below, in which the ratio of the total content of C.I. Acid Red 52 and C.I. Acid Red 92 to the content of the dye represented by the formula (I) is 1:0.1 to 1:4.

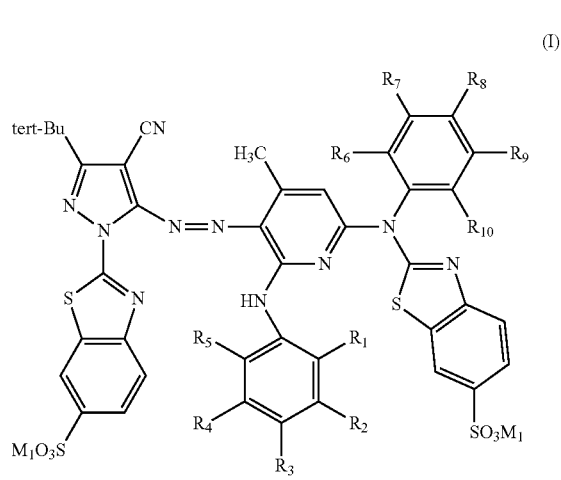

(I)

(where, $R_1$ to $R_{10}$ each represent a hydrogen atom, an alkyl group having 1 to 6 carbon atoms, a sulfo group, or a salt thereof; in the case where $R_1$ and $R_5$ each independently represent an alkyl group, the total of the number of carbon atoms constituting the alkyl group of $R_1$ and the number of carbon atoms constituting the alkyl group of $R_5$ is 3 or more, and $R_1$ and $R_5$ each may have a substituent; in the case where $R_6$ and $R_{10}$ each independently represent an alkyl group, the total of the number of carbon atoms constituting the alkyl group of $R_6$ and the number of carbon atoms constituting the alkyl group of $R_{10}$ is 3 or more, and $R_6$ and $R_{10}$ each may have a substituent; and $M_1$ represents a hydrogen atom or an alkali metal atom).

According to a second aspect of the invention, an ink composition includes at least C.I. Acid Red 52, C.I. Acid Red 92, C.I. Direct Yellow 87, and a dye represented by the formula (I) above, in which the ratio of the total content of C.I. Acid Red 52, C.I. Acid Red 92, and C.I. Direct Yellow 87 to the content of the dye represented by the formula (I) above is 1:0.06 to 1:0.7.

According to a third aspect of the invention, an ink jet recording method includes ejecting droplets of an ink composition and making the droplets adhere to a recording medium so that printing can be performed, in which the ink composition according to the first or second aspect of the invention is used.

According to some aspects of the invention, it is possible to provide an ink composition which can result in recorded matter having good lightfastness without impairing fluorescence intensity and color developability.

DESCRIPTION OF EXEMPLARY EMBODIMENTS

Ink Composition

In accordance with an embodiment of the invention, an ink composition includes at least C.I. Acid Red 52, C.I. Acid Red 92, and a dye represented by the formula (I) above, in which the ratio of the total content of C.I. Acid Red 52 and C.I. Acid Red 92 to the content of the dye represented by the formula (I) is 1:0.1 to 1:4. Thereby, it is possible to obtain recorded matter having good lightfastness without impairing fluorescence intensity and color developability.

In accordance with another embodiment of the invention, an ink composition includes at least C.I. Acid Red 52, C.I. Acid Red 92, C.I. Direct Yellow 87, and a dye represented by the formula (I) above, in which the ratio of the total content of C.I. Acid Red 52, C.I. Acid Red 92, and C.I. Direct Yellow 87 to the content of the dye represented by the formula (I) above is 1:0.06 to 1:0.7. Thereby, it is possible to obtain recorded matter having good lightfastness without impairing fluorescence intensity and color developability. The individual components contained in the ink composition according to the embodiments of the invention will be described below.

Dye

The ink composition according to an embodiment of the invention includes at least C.I. Acid Red 52, C.I. Acid Red 92, and a dye represented by the formula (I) above. The ink composition can further include C.I. Direct Yellow 87. Note that tert-Bu represents a tert-butyl group.

Examples of a group of compounds of dyes represented by the formula (I) above according to a preferred embodiment of the invention include a group of compounds in which $R_1$ to $R_{10}$ each represent a hydrogen atom, an alkyl group having 1 to 5 carbon atoms, a sulfo group, or a lithium salt thereof; in the case where $R_1$ and $R_5$ each independently represent an alkyl group, the total of the number of carbon atoms constituting the alkyl group of $R_1$ and the number of carbon atoms constituting the alkyl group of $R_5$ is 4 to 6, and $R_1$ and $R_5$ each do not have a substituent; in the case where $R_6$ and $R_{10}$ each independently represent an alkyl group, the total of the number of carbon atoms constituting the alkyl group of $R_6$ and the number of carbon atoms constituting the alkyl group of $R_{10}$ is 4 to 6, and $R_6$ and $R_{10}$ each do not have a substituent; and $M_1$ represents an alkali metal atom.

Examples of a group of compounds of dyes represented by the formula (I) above according to a more preferred embodiment of the invention include a group of compounds in which $R_1$ to $R_{10}$ each represent a hydrogen atom, an alkyl group having 1 to 2 carbon atoms, a sulfo group, or a lithium salt thereof; in the case where $R_1$ and $R_5$ each independently represent an alkyl group, the total of the number of carbon atoms constituting the alkyl group of $R_1$ and the number of carbon atoms constituting the alkyl group of $R_5$ is 4, and $R_1$ and $R_5$ each do not have a substituent; in the case where $R_6$ and $R_{10}$ each independently represent an alkyl group, the total of the number of carbon atoms constituting the alkyl group of $R_6$ and the number of carbon atoms constituting the alkyl group of $R_{10}$ is 4, and $R_6$ and $R_{10}$ each do not have a substituent; and $M_1$ represents a lithium atom.

In accordance with some embodiments of the invention, the ratio of the total content of C.I. Acid Red 52 and C.I. Acid Red 92 to the content of the dye represented by the formula (I) is 1:0.1 to 1:4, and preferably 1:0.1 to 1:1.1. By setting the ratio in this range, it is possible to obtain an ink composition which is more excellent in terms of fluorescence intensity.

In accordance with some embodiments of the invention, the ratio of the total content of C.I. Acid Red 52, C.I. Acid Red 92, and C.I. Direct Yellow 87 to the content of the dye represented by the formula (I) above is 1:0.06 to 1:0.7, and preferably 1:0.09 to 1:0.48. By setting the ratio in this range, it is possible to obtain an ink composition which is more excellent in terms of fluorescence intensity.

In accordance with any one of the embodiments of the invention, the dye represented by the formula (I) above is not particularly limited as long as it can result in recorded matter having good lightfastness without impairing fluorescence intensity and color developability. The content of the dye in the ink composition is preferably 0.2% to 2.0% by mass, more preferably 0.2% to 0.8% by mass. By setting the content in this range, it is possible to obtain an ink composition which is more excellent in terms of fluorescence intensity. Above all, by setting the content of the dye represented by the formula (I) above at 2.0% by mass or less, it is possible to prevent occurrence of ink clogging in the ink flow passage due to dye precipitation during storage, in particular, occurrence of nozzle clogging in the case where the ink composition is left in a state of being filled in an ink jet head under a high temperature condition.

In accordance with any one of the embodiments of the invention, the content of C.I. Acid Red 52 in the ink composition is preferably 0.04% to 0.1% by mass, more preferably 0.08% to 0.1% by mass. By setting the content in this range, it is possible to obtain recorded matter having good lightfastness without impairing fluorescence intensity and color developability. Above all, by setting the content of C.I. Acid Red 52 at 0.1% by mass or less, it is possible to prevent occurrence of ink clogging in the ink flow passage due to dye precipitation during storage, in particular, occurrence of nozzle clogging in the case where the ink composition is left in a state of being filled in an ink jet head under a high temperature condition.

In accordance with any one of the embodiments of the invention, the content of C.I. Acid Red 92 in the ink composition is preferably 0.4% to 1.2% by mass, more preferably 0.6% to 0.9% by mass. By setting the content in this range, it is possible to obtain recorded matter having good lightfastness without impairing fluorescence intensity and color developability. Above all, by setting the content of C.I. Acid Red 92 at 1.2% by mass or less, it is possible to prevent occurrence of ink clogging in the ink flow passage due to dye precipitation during storage, in particular, occurrence of nozzle clogging in the case where the ink composition is left in a state of being filled in an ink jet head under a high temperature condition.

In accordance with some embodiments of the invention, the content of C.I. Direct Yellow 87 in the ink composition is preferably 2.4% to 4% by mass, more preferably 2.4% to 3.2% by mass. By setting the content in this range, it is possible to obtain recorded matter having good lightfastness without impairing fluorescence intensity and color developability. Above all, by setting the content of C.I. Direct Yellow 87 at 4% by mass or less, it is possible to obtain recorded matter having enhanced fluorescence intensity and color developability, which depend on the concentration of C.I. Direct Yellow 87 contained in the ink composition, and it is possible to prevent occurrence of ink clogging in the ink flow passage due to dye precipitation during storage, in particular, occurrence of nozzle clogging in the case where the ink composition is left in a state of being filled in an ink jet head under a high temperature condition.

Water and Other Components

The ink composition according to any one of the embodiments of the invention preferably contains water as a main solvent. More preferably, pure water or ultrapure water, such as ion-exchanged water, ultrafiltrated water, reverse osmotically purified water, or distilled water, is used. In particular, use of water sterilized by irradiation with ultraviolet light, addition of hydrogen peroxide, or the like is preferable in view of preventing occurrence of fungi and bacterium, thereby enabling long-term storage.

The ink composition according to any one of the embodiments of the invention preferably contains a water-soluble organic compound. The water-soluble organic solvent is preferably a low boiling point organic solvent, and examples thereof include methanol, ethanol, n-propyl alcohol, iso-propyl alcohol, n-butanol, sec-butanol, tert-butanol, iso-butanol, and n-pentanol. In particular, a monohydric alcohol is preferable. The low boiling point organic solvent has an effect of shortening ink drying time. The amount of the low boiling point organic solvent to be added is preferably 0.1% to 30% by mass, more preferably 5% to 10% by mass, of the ink.

Furthermore, an ink composition according to a preferred embodiment of the invention further contains a wetting agent composed of one or two or more high boiling point organic solvents. Preferred examples of the high boiling point organic solvent include polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, diethylene glycol monoisobutyl ether, diethylene glycol monohexyl ether, triethylene glycol monomethyl ether, triethylene glycol monoethyl ether, triethylene glycol monobutyl ether, hexaethylene glycol monoethylhexyl ether (Newcol 1006 manufactured by Nippon Nyukazai Co., Ltd.), and tetraethylene glycol monoethylhexyl ether (Newcol 1004 manufactured by Nippon Nyukazai Co., Ltd.); urea; 2-pyrrolidone; N-methyl-2-pyrrolidone; and 1,3-dimethyl-2-imidazolidinone. Preferably, an alkyl ether of a polyhydric alcohol is used.

In the embodiment of the invention, preferred examples of the alkyl ether of a polyhydric alcohol include triethylene glycol monobutyl ether, diethylene glycol monobutyl ether, triethylene glycol monomethyl ether, diethylene glycol monoisobutyl ether, diethylene glycol monohexyl ether, hexaethylene glycol monoethylhexyl ether, and tetraethylene glycol monoethylhexyl ether. These alkyl ethers of polyhydric alcohols may be used alone or in combination of two or more. More preferred examples of the alkyl ether of a polyhydric alcohol include a combination of hexaethylene glycol monoethylhexyl ether and triethylene glycol monobutyl ether and a combination of tetraethylene glycol monoethylhexyl ether and triethylene glycol monobutyl ether. By using these alkyl ethers of polyhydric alcohols in combination, it is possible to obtain an ink composition which is excellent in terms of permeability, stability under a high-temperature environment, and the like. The ratio of the two alkyl ethers of polyhydric alcohols is not particularly limited, but is preferably 1:1 to 1:3.

The amount of the high boiling point organic solvent to be added is preferably in the range of 0.5% to 15% by mass, and more preferably in the range of 1% to 10% by mass. By setting the amount of the high boiling point organic solvent in the range described above, it is possible to obtain a fluorescent ink composition having higher fluorescence intensity and better color developability. Preferably, the total content of tetraethylene glycol monoethylhexyl ether and triethylene glycol monobutyl ether in the ink composition is 1% to 6% by mass, and the total content of hexaethylene glycol monoethylhexyl ether and triethylene glycol monobutyl ether in the ink composition is 1% to 10% by mass.

In accordance with a preferred embodiment of the invention, the ink composition according to any one of the embodiments of the invention preferably further contains a saccharide, a tertiary amine, an alkali hydroxide, or ammonia. By using any of these additives, it is possible to obtain an ink composition in which coagulation of colorants and an increase in viscosity of the ink composition can be prevented even during long-term storage, thus providing excellent preservation stability, in which fluidity and redispersibility can be maintained for a long period of time even when left to stand in an open state (in a state of being in contact with air at room temperature), and which has high ejection stability without causing nozzle clogging during printing or at the time of restarting after discontinuation of printing.

Examples of the saccharide that can be added to the ink composition according to any one of the embodiments of the invention include monosaccharides, disaccharides, oligosaccharides (including trisaccharides and tetrasaccharides), and polysaccharides. Preferred examples include glucose, mannose, fructose, ribose, xylose, arabinose, galactose, aldonic acid, glucitol, sorbitol, maltose, cellobiose, lactose, sucrose, trehalose, and maltotriose. The term "polysaccharides" means, in a broad sense, saccharides including substances widely occurring in nature, such as alginic acid, α-cyclodextrin, and cellulose. Furthermore, examples of derivatives of these saccharides include a reduced sugar of the saccharides described above (e.g., a sugar alcohol represented by the general formula $HOCH_2(CHOH)_nCH_2OH$, where n represents an integer of 2 to 5), an oxidized sugar (e.g., aldonic acid, uronic acid, or the like), an amino acid, and a thiosugar. In particular, a sugar alcohol is preferable, and specific examples thereof include maltitol, sorbitol, and the like.

The content of the saccharide in the ink composition is in the range of 0.1% to 40% by mass, preferably in the range of 1% to 30% by mass.

Examples of the tertiary amine that can be added to the ink composition according to any one of the embodiments of the invention include trimethylamine, triethylamine, triethanolamine, dimethylethanolamine, diethylethanolamine, triisopropenolamine, and butyldiethanolamine. These tertiary amines may be used alone or in combination. The amount of the tertiary amine to be added to the ink composition according to any one of the embodiments of the invention is 0.1% to 10% by mass, preferably 0.5% to 5% by mass.

Examples of the alkali hydroxide that can be added to the ink composition according to any one of the embodiments of the invention include potassium hydroxide, sodium hydroxide, and lithium hydroxide. The amount of the alkali hydroxide to be added to the ink composition according to any one of the embodiments of the invention is 0.01% to 5% by mass, preferably 0.05% to 3% by mass.

The ink composition according to any one of the embodiments of the invention may further contain a surfactant. Examples of the surfactant include anionic surfactants, such as sodium dodecylbenzenesulfonate, sodium lauryl sulfate, and ammonium salts of polyoxyethylene alkyl ether sulfates; nonionic surfactants, such as polyoxyethylene alkyl ethers, polyoxyethylene alkyl esters, polyoxyethylene sorbitan fatty acid esters, polyoxyethylene alkylphenyl ethers, polyoxyethylene alkylamines, and polyoxyethylene alkylamides; and acetylene glycols, such as Olefin Y and Surfynols 82, 104, 440, 465, and 485 (all of which are manufactured by Air Products and Chemicals Inc.), and Olfin PD002W (manufactured by Nissin Chemical Industry Co., Ltd.). These surfactants may be used alone or in combination of two or more. Preferably, the surfactant is Olfin PD002W.

The ink composition according to any one of the invention may be incorporated with a pH regulator, a preservative, a fungicide, a phosphorus-based antioxidant, and the like, as necessary. Preferred examples of the preservative include Proxel CRL, Proxel BDN, Proxel GXL, Proxel XL-2, Proxel IB, and Proxel TN.

Ink Jet Recording Method

An ink jet recording method using the ink composition according to any one of the embodiments of the invention includes ejecting droplets of the ink composition and making the droplets adhere to a heated recording medium so that printing can be performed. Examples of the method of ejecting droplets of the ink composition include a method in which electric signals are converted into mechanical signals using an electrostrictive element, and thereby, ink stored in a nozzle head portion is intermittently ejected onto a surface of a recording medium to write letters and symbols; and a method in which ink stored in a nozzle head portion is rapidly heated at a position very close to an ejection port to generate bubbles, and volume expansion caused by the bubbles makes ink be intermittently ejected to write letters and symbols on a surface of a recording medium. In accordance with a preferred embodiment of the invention, an ink set containing the ink composition according to any one of the embodiments of the invention can be preferably used in an ink jet recording method using an electrostrictive element. Preferably, droplets of the ink composition are ejected from a recording head which ejects ink droplets using the mechanical action of a piezoelectric element.

Recorded matter recorded on a recording medium using the ink composition according to any one of the embodiments of the invention has an image having good lightfastness in which fluorescence intensity and color developability are not impaired.

As the recording medium, any of various recording media can be used. Examples thereof include envelopes, ink jet exclusive paper (matte paper, glossy paper, and the like), plain paper, actual stock, and films. In particular, envelopes are preferable.

EXAMPLE A

The invention will be described in more detail on the basis of the examples below. However, it is to be understood that the invention is not limited to the examples.
Preparation of Ink Composition In accordance with the compositions shown in Table 1, the components were mixed and filtered through a 10-μm membrane filter to prepare inks. Values in Table 1 are the contents of the components in the inks (% by mass). In Table 1, TEG-mBE denotes triethylene glycol monobutyl ether, N1006 denotes hexaethylene glycol monoethylhexyl ether (Newcol 1006 manufactured by Nippon Nyukazai Co., Ltd.), EDTA denotes disodium ethylenediaminetetraacetate, PD002W denotes Olfin PD002W (manufactured by Nissin Chemical Industry Co., Ltd.), MD20 denotes Surfynol MD20 (manufactured by Air Products Japan, Inc.), and Proxel XL2 denotes 1,2-dibenzisothiazolin-3-one (manufactured by Avecia Inc.). Furthermore, "Remainder" showing the amount of water corresponds to the amount that makes the total of 100% together with the other components. In addition, magenta dyes A, B, C, and D in Table 1 are compounds represented by the formulae below. Each of magenta dyes C and D is obtained by mixing a compound in which $M=NH_4$ and a compound in which $M=Na$ at a ratio (molar ratio) of 1:1. Magenta dye A is an example of a compound represented by the formula (I) above.

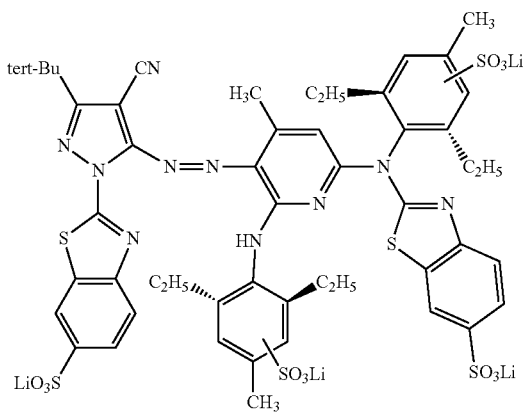

Magenta dye A

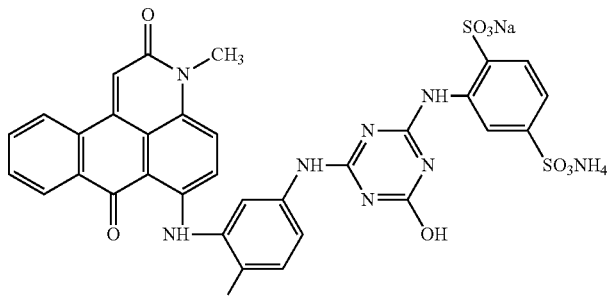

Magenta dye B

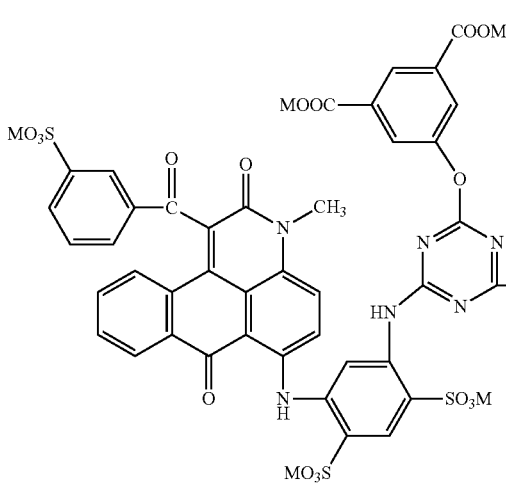

Magenta dye C

-continued

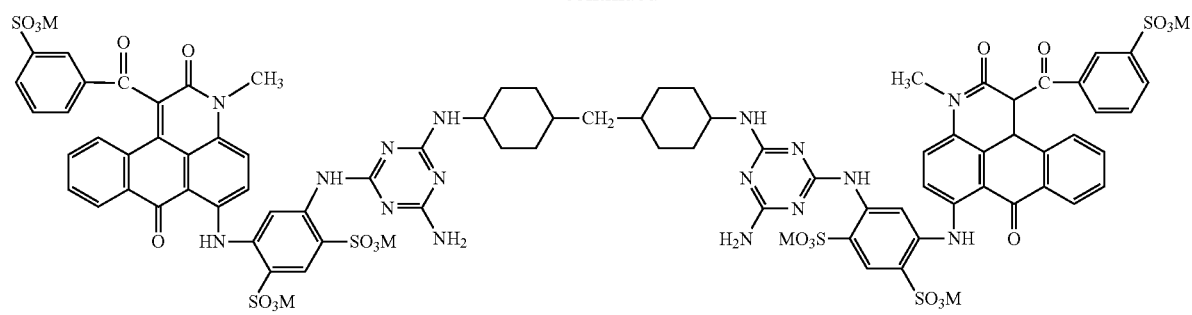

Magenta dye D

TABLE 1

|  | Example 1 | Example 2 | Example 3 | Example 4 | Example 5 | Example 6 | Example 7 | Comparative Example 1 |
|---|---|---|---|---|---|---|---|---|
| Magenta dye A | 2.00 | 1.40 | 1.00 | 0.80 | 0.60 | 0.40 | 0.20 | — |
| Magenta dye B | — | — | — | — | — | — | — | — |
| Magenta dye C | — | — | — | — | — | — | — | — |
| Magenta dye D | — | — | — | — | — | — | — | — |
| C.I. Acid Red 52(AR52) | 0.045 | 0.045 | 0.070 | 0.070 | 0.080 | 0.090 | 0.100 | 0.115 |
| C.I. Acid Red 92(AR92) | 0.455 | 0.455 | 0.680 | 0.680 | 0.795 | 0.895 | 1.134 | 1.134 |
| C.I. Direct Yellow 87 | 2.40 | 2.40 | 2.40 | 2.40 | 2.40 | 2.40 | 2.40 | 4.00 |
| N1006 | 2.0 | 3.0 | 2.0 | 3.0 | 3.0 | 2.0 | 2.0 | 2.0 |
| TEG-mBE | 3.0 | 3.0 | 3.0 | 3.0 | 2.0 | 3.0 | 3.0 | 3.35 |
| Glycerol | 19.0 | 19.0 | 19.0 | 19.0 | 19.0 | 20.0 | 20.0 | 17.0 |
| Triethylene glycol | 4.50 | 4.50 | 4.50 | 4.50 | 4.50 | 4.50 | 4.50 | 4.50 |
| PD002W | 0.15 | 0.15 | 0.15 | 0.15 | 0.15 | 0.15 | 0.15 | 0.15 |
| MD20 | 0.10 | 0.10 | 0.10 | 0.10 | 0.10 | 0.10 | 0.10 | 0.10 |
| EDTA | 0.02 | 0.02 | 0.02 | 0.02 | 0.02 | 0.02 | 0.02 | 0.02 |
| Proxel XL2 | 0.30 | 0.30 | 0.30 | 0.30 | 0.30 | 0.30 | 0.30 | 0.30 |
| Triethanolamine | 0.30 | 0.30 | 0.30 | 0.30 | 0.30 | 0.30 | 0.30 | 0.30 |
| Water | Remainder | Remainder | Remainder | Remainder | Remainder | Remainder | Remainder | Remainder |
| (AR52 + AR92): magenta dye ratio | 1:4 | 1:2.8 | 1:1.3 | 1:1.07 | 1:0.69 | 1:0.41 | 1:0.16 | — |

|  | Comparative Example 2 | Comparative Example 3 | Comparative Example 4 | Comparative Example 5 | Comparative Example 6 |
|---|---|---|---|---|---|
| Magenta dye A | — | — | — | 2.50 | 0.10 |
| Magenta dye B | 1.00 | — | — | — | — |
| Magenta dye C | — | 1.00 | — | — | — |
| Magenta dye D | — | — | 1.00 | — | — |
| C.I. Acid Red 52(AR52) | 0.070 | 0.070 | 0.070 | 0.045 | 0.100 |
| C.I. Acid Red 92(AR92) | 0.680 | 0.680 | 0.680 | 0.455 | 1.134 |
| C.I. Direct Yellow 87 | 2.40 | 2.40 | 2.40 | 2.40 | 2.40 |
| N1006 | 2.0 | 2.0 | 2.0 | 2.0 | 2.0 |
| TEG-mBE | 3.0 | 3.0 | 3.0 | 3.0 | 3.0 |
| Glycerol | 19.0 | 19.0 | 19.0 | 19.0 | 20.0 |
| Triethylene glycol | 4.50 | 4.50 | 4.50 | 4.50 | 4.50 |
| PD002W | 0.15 | 0.15 | 0.15 | 0.15 | 0.15 |
| MD20 | 0.10 | 0.10 | 0.10 | 0.10 | 0.10 |
| EDTA | 0.02 | 0.02 | 0.02 | 0.02 | 0.02 |
| Proxel XL2 | 0.30 | 0.30 | 0.30 | 0.30 | 0.30 |
| Triethanolamine | 0.30 | 0.30 | 0.30 | 0.30 | 0.30 |
| Water | Remainder | Remainder | Remainder | Remainder | Remainder |
| (AR52 + AR92): magenta dye ratio | 1:1.3 | 1:1.3 | 1:1.3 | 1:4.8 | 1:0.08 |

Evaluation Method
Evaluation of Color Developability

Using an ink jet printer MJ-8000C (manufactured by Seiko Epson Corporation), each ink composition was printed in a solid pattern on a Script DL envelope at a resolution of 360 dpi. The printed recorded matter was left to stand at 24° C. for 24 hours, and then the OD value (ODm) of the solid portion was measured with a Gretag densitometer (manufactured by Gretag Macbeth Corp.). Evaluation was made in accordance with the following criteria:

A: OD value of 0.90 or more
B: OD value of 0.84 or more and less than 0.90
C: OD value of less than 0.84

The evaluation results are shown in Tables 2 and 3 below.

Evaluation of Fluorescence Intensity

A solid pattern was printed at a 100% duty on a Script DL envelope with an ink jet printer MJ-8000C (manufactured by Seiko Epson Corporation) provided with an on-demand multi-print head, which applies thermal energy to an ink composition in response to print signals and thereby ejects the ink composition. The fluorescence intensity was measured, using a fluorescence spectrophotometer (F-4500) manufactured by Hitachi, Ltd., under the conditions in which the excitation wavelength was set at 365 nm, and the fluorescence intensity at a maximum fluorescence wavelength between 550 nm and 650 nm was measured. Evaluation was made in accordance with the following criteria:

A: Fluorescence intensity of 300 or more
B: Fluorescence intensity of 200 or more and less than 300
C: Fluorescence intensity of 100 or more and less than 200
D: Fluorescence intensity of less than 100

The evaluation results are shown in Tables 2 and 3 below.

Evaluation of Lightfastness

Using an ink jet printer MJ-8000C (manufactured by Seiko Epson Corporation), each ink composition was printed in a solid pattern on a Script DL envelope at a resolution of 360 dpi. The printed recorded matter was left to stand at 24° C. for 24 hours, and then, using a xenon weather meter (XL75S) manufactured by Suga Test Instruments Co., Ltd., a lightfastness test was carried out at 24° C. and 50% RH for 24 hours. Subsequently, using a Gretag densitometer (manufactured by Gretag Macbeth Corp.), the OD value (ODm) of the solid portion was measured. The relative optical density (ROD) was calculated from the measured result in accordance with the equation ROD (%)=$(D/D_0) \times 100$ (where D is the OD value after the lightfastness test, and $D_0$ is the OD value before the lightfastness test). Evaluation was made in accordance with the following criteria:

A: ROD of 60% or more
B: ROD of 20% or more and less than 60%
C: ROD of less than 20%

The evaluation results are shown in Tables 2 and 3 below.

TABLE 2

|  | Example 1 | Example 2 | Example 3 | Example 4 | Example 5 | Example 6 | Example 7 |
|---|---|---|---|---|---|---|---|
| Evaluation of color developability | A | B | B | B | B | B | B |
| Evaluation of fluorescence intensity | B | B | B | A | A | A | A |
| Evaluation of lightfastness | A | B | B | B | B | B | B |

TABLE 3

|  | Comparative Example 1 | Comparative Example 2 | Comparative Example 3 | Comparative Example 4 | Comparative Example 5 | Comparative Example 6 |
|---|---|---|---|---|---|---|
| Evaluation of color developability | B | B | A | A | A | C |
| Evaluation of fluorescence intensity | A | D | D | D | C | A |
| Evaluation of lightfastness | C | B | B | B | A | C |

EXAMPLE B

Preparation of Ink Composition

In accordance with the compositions shown in Tables 4 and 5, the components were mixed and filtered through a 10-μm membrane filter to prepare inks. Values in Tables 4 and 5 are the contents of the components in the inks (% by mass). In Tables 4 and 5, TEG-mBE denotes triethylene glycol monobutyl ether, N1006 denotes hexaethylene glycol monoethylhexyl ether (Newcol 1006 manufactured by Nippon Nyukazai Co., Ltd.), EDTA denotes disodium ethylenediaminetetraacetate, PD002W denotes Olfin PD002W (manufactured by Nissin Chemical Industry Co., Ltd.), MD20 denotes Surfynol MD20 (manufactured by Air Products Japan, Inc.), and Proxel XL2 denotes 1,2-dibenzisothiazolin-3-one (manufactured by Avecia Inc.). Furthermore, "Remainder" showing the amount of water corresponds to the amount that makes the total of 100% together with the other components.

In addition, magenta dyes A, B, C, and D in Tables 4 and 5 are compounds represented by the formulae above. Each of magenta dyes C and D is obtained by mixing a compound in which $M=NH_4$ and a compound in which $M=Na$ at a ratio (molar ratio) of 1:1. Magenta dye A is an example of a compound represented by the formula (I) above.

TABLE 4

|  | Example 1 | Example 2 | Example 3 | Example 4 | Example 5 | Example 6 | Example 7 |
|---|---|---|---|---|---|---|---|
| Magenta dye A | 2.00 | 1.40 | 1.00 | 0.80 | 0.60 | 0.40 | 0.20 |
| Magenta dye B | — | — | — | — | — | — | — |
| Magenta dye C | — | — | — | — | — | — | — |
| Magenta dye D | — | — | — | — | — | — | — |
| C.I. Acid Red 52(AR52) | 0.045 | 0.045 | 0.070 | 0.070 | 0.080 | 0.090 | 0.100 |
| C.I. Acid Red 92(AR92) | 0.455 | 0.455 | 0.680 | 0.680 | 0.795 | 0.895 | 1.134 |
| C.I. Direct Yellow 87(DY87) | 2.40 | 2.40 | 2.40 | 2.40 | 2.40 | 2.40 | 2.40 |
| N1006 | 2.0 | 3.0 | 2.0 | 3.0 | 3.0 | 2.0 | 2.0 |
| TEG-mBE | 3.0 | 3.0 | 3.0 | 3.0 | 2.0 | 3.0 | 3.0 |
| Glycerol | 19.0 | 19.0 | 19.0 | 19.0 | 19.0 | 20.0 | 20.0 |
| Triethylene glycol | 4.50 | 4.50 | 4.50 | 4.50 | 4.50 | 4.50 | 4.50 |
| PD002W | 0.15 | 0.15 | 0.15 | 0.15 | 0.15 | 0.15 | 0.15 |
| MD20 | 0.10 | 0.10 | 0.10 | 0.10 | 0.10 | 0.10 | 0.10 |
| EDTA | 0.02 | 0.02 | 0.02 | 0.02 | 0.02 | 0.02 | 0.02 |
| Proxel XL2 | 0.30 | 0.30 | 0.30 | 0.30 | 0.30 | 0.30 | 0.30 |
| Triethanolamine | 0.30 | 0.30 | 0.30 | 0.30 | 0.30 | 0.30 | 0.30 |
| Water | Remainder | Remainder | Remainder | Remainder | Remainder | Remainder | Remainder |
| (AR52 + AR92 + DY87): magenta dye ratio | 1:0.69 | 1:0.48 | 1:0.32 | 1:0.25 | 1:0.18 | 1:0.12 | 1:0.06 |

|  | Example 8 | Example 9 | Example 10 | Example 11 | Example 12 |
|---|---|---|---|---|---|
| Magenta dye A | 2.00 | 1.40 | 0.40 | 0.40 | 0.40 |
| Magenta dye B | — | — | — | — | — |
| Magenta dye C | — | — | — | — | — |
| Magenta dye D | — | — | — | — | — |
| C.I. Acid Red 52(AR52) | 0.045 | 0.045 | 0.090 | 0.090 | 0.090 |
| C.I. Acid Red 92(AR92) | 0.455 | 0.455 | 0.895 | 0.895 | 0.895 |
| C.I. Direct Yellow 87(DY87) | 2.40 | 2.40 | 2.40 | 3.20 | 4.00 |
| N1006 | 2.0 | 3.0 | 3.0 | 2.0 | 2.0 |
| TEG-mBE | 3.0 | 3.0 | 0.5 | 3.0 | 3.0 |
| Glycerol | 19.0 | 19.0 | 24.0 | 20.0 | 20.0 |
| Triethylene glycol | 4.50 | 4.50 | 2.00 | 4.50 | 4.50 |
| PD002W | 0.15 | 0.15 | 0.15 | 0.15 | 0.15 |
| MD20 | 0.10 | 0.10 | 0.10 | 0.10 | 0.10 |
| EDTA | 0.02 | 0.02 | 0.02 | 0.02 | 0.02 |
| Proxel XL2 | 0.30 | 0.30 | 0.30 | 0.30 | 0.30 |
| Triethanolamine | 0.30 | 0.30 | 0.30 | 0.30 | 0.30 |
| Water | Remainder | Remainder | Remainder | Remainder | Remainder |
| (AR52 + AR92 + DY87): magenta dye ratio | 1:0.69 | 1:0.48 | 1:0.12 | 1:0.096 | 1:0.08 |

TABLE 5

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Magenta dye A | — | — | — | — | 2.50 | 0.10 | 2.00 | 0.40 |
| Magenta dye B | — | 1.00 | — | — | — | — | — | — |
| Magenta dye C | — | — | 1.00 | — | — | — | — | — |
| Magenta dye D | — | — | — | 1.00 | — | — | — | — |
| C.I. Acid Red 52(AR52) | 0.115 | 0.070 | 0.070 | 0.070 | 0.045 | 0.100 | 0.045 | 0.090 |
| C.I. Acid Red 92(AR92) | 1.134 | 0.680 | 0.680 | 0.680 | 0.455 | 1.134 | 0.455 | 0.895 |
| C.I. Direct Yellow 87(DY87) | 4.00 | 2.40 | 2.40 | 2.40 | 2.40 | 2.40 | 2.00 | 7.00 |

TABLE 5-continued

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| N1006 | 2.0 | 2.0 | 2.0 | 2.0 | 2.0 | 2.0 | 2.0 | 2.0 |
| TEG-mBE | 3.35 | 3.0 | 3.0 | 3.0 | 3.0 | 3.0 | 3.0 | 3.0 |
| Glycerol | 17.0 | 19.0 | 19.0 | 19.0 | 19.0 | 20.0 | 19.0 | 20.0 |
| Triethylene glycol | 4.50 | 4.50 | 4.50 | 4.50 | 4.50 | 4.50 | 4.50 | 4.50 |
| PD002W | 0.15 | 0.15 | 0.15 | 0.15 | 0.15 | 0.15 | 0.15 | 0.15 |
| MD20 | 0.10 | 0.10 | 0.10 | 0.10 | 0.10 | 0.10 | 0.10 | 0.10 |
| EDTA | 0.02 | 0.02 | 0.02 | 0.02 | 0.02 | 0.02 | 0.02 | 0.02 |
| Proxel XL2 | 0.30 | 0.30 | 0.30 | 0.30 | 0.30 | 0.30 | 0.30 | 0.30 |
| Triethanolamine | 0.30 | 0.30 | 0.30 | 0.30 | 0.30 | 0.30 | 0.30 | 0.30 |
| Water | Remainder | Remainder | Remainder | Remainder | Remainder | Remainder | Remainder | Remainder |
| (AR52 + AR92 + DY87): magenta dye ratio | — | 1:0.32 | 1:0.32 | 1:0.32 | 1:0.86 | 1:0.03 | 1:0.8 | 1:0.05 |

Evaluation Method

Evaluation of Color Developability

Using an ink jet printer MJ-8000C (manufactured by Seiko Epson Corporation), each ink composition was printed in a solid pattern on a Script DL envelope at a resolution of 360 dpi. The printed recorded matter was left to stand at 24° C. for 24 hours, and then the OD value (ODm) of the solid portion was measured with a Gretag densitometer (manufactured by Gretag Macbeth Corp.). Evaluation was made in accordance with the following criteria:

A: OD value of 0.90 or more
B: OD value of 0.84 or more and less than 0.90
C: OD value of less than 0.84

The evaluation results are shown in Tables 6 and 7 below.

Evaluation of Fluorescence Intensity

A solid pattern was printed at a 100% duty on a Script DL envelope with an ink jet printer MJ-8000C (manufactured by Seiko Epson Corporation) provided with an on-demand multi-print head, which applies thermal energy to an ink composition in response to print signals and thereby ejects the ink composition. The fluorescence intensity was measured, using a fluorescence spectrophotometer (F-4500) manufactured by Hitachi, Ltd., under the conditions in which the excitation wavelength was set at 365 nm, and the fluorescence intensity at a maximum fluorescence wavelength between 550 nm and 650 nm was measured. Evaluation was made in accordance with the following criteria:

S: Fluorescence intensity of 400 or more
A: Fluorescence intensity of 300 or more and less than 400
B: Fluorescence intensity of 200 or more and less than 300
C: Fluorescence intensity of 100 or more and less than 200
D: Fluorescence intensity of less than 100

The evaluation results are shown in Tables 6 and 7 below.

Evaluation of Lightfastness

Using an ink jet printer MJ-8000C (manufactured by Seiko Epson Corporation), each ink composition was printed in a solid pattern on a Script DL envelope at a resolution of 360 dpi. The printed recorded matter was left to stand at 24° C. for 24 hours, and then, using a xenon weather meter (XL75S) manufactured by Suga Test Instruments Co., Ltd., a lightfastness test was carried out at 24° C. and 50% RH for 24 hours. Subsequently, using a Gretag densitometer (manufactured by Gretag Macbeth Corp.), the OD value (ODm) of the solid portion was measured. The relative optical density (ROD) was calculated from the measured result in accordance with the equation ROD (%)=$(D/D_0) \times 100$ (where D is the OD value after the lightfastness test, and $D_0$ is the OD value before the lightfastness test). Evaluation was made in accordance with the following criteria:

A: ROD of 60% or more
B: ROD of 20% or more and less than 60%
C: ROD of less than 20%

The evaluation results are shown in Tables 6 and 7 below.

Evaluation of Clogged Nozzle Recovery

Using an ink jet printer PM-A750 (manufactured by Seiko Epson Corporation), ink was filled in the head by repeating cleaning, and after confirming that ink was ejected from each nozzle, the printer was left to stand under an environment of 40° C. for one month. Then, power was supplied to the printer, and the number of cleaning operations required for enabling ejection from all the nozzles was measured. Evaluation was made in accordance with the following criteria:

○: No cleaning operation
Δ: One cleaning operation
x: Two or more cleaning operations The evaluation results are shown in Tables 6 and 7 below.

TABLE 6

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Evaluation of color developability | A | B | B | B | B | B | B | A | B | B | B | B |
| Evaluation of fluorescence intensity | B | B | B | A | A | A | A | B | B | S | A | A |
| Evaluation of lightfastness | A | B | B | B | B | B | B | A | B | B | B | B |
| Clogged nozzle recovery | ○ | ○ | ○ | ○ | ○ | ○ | ○ | ○ | ○ | ○ | ○ | Δ |

TABLE 7

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Evaluation of color developability | B | B | A | A | A | C | B | B |
| Evaluation of fluorescence intensity | S | D | D | D | C | A | C | A |
| Evaluation of lightfastness | C | B | B | B | A | C | A | B |
| Clogged nozzle recovery | Δ | ○ | ○ | ○ | ○ | ○ | ○ | x |

What is claimed is:

1. An ink composition comprising:
   C.I. Acid Red 52;
   C.I. Acid Red 92; and
   a dye represented by the formula (I) below,
   wherein the ratio of the total content of the C.I. Acid Red 52 and the C.I. Acid Red 92 to the content of the dye represented by the formula (I) is 1:0.1 to 1:4,

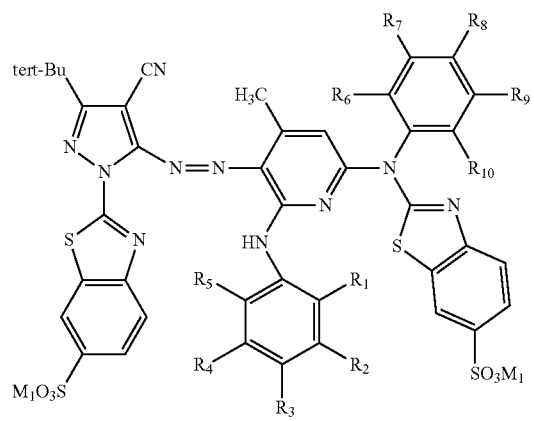

(wherein, $R_1$ to $R_{10}$ each represent a hydrogen atom, an alkyl group having 1 to 6 carbon atoms, a sulfo group, or a salt thereof;
in the case where $R_1$ and $R_5$ each independently represent an alkyl group, the total of the number of carbon atoms constituting the alkyl group of $R_1$ and the number of carbon atoms constituting the alkyl group of $R_5$ is 3 or more, and $R_1$ and $R_5$ each may have a substituent;
in the case where $R_6$ and $R_{10}$ each independently represent an alkyl group, the total of the number of carbon atoms constituting the alkyl group of $R_6$ and the number of carbon atoms constituting the alkyl group of $R_{10}$ is 3 or more, and $R_6$ and $R_{10}$ each may have a substituent; and
$M_1$ represents a hydrogen atom or an alkali metal atom.

2. The ink composition according to claim 1, wherein the content of the dye represented by the formula (I) above in the ink composition is 0.2% to 2.0% by mass.

3. The ink composition according to claim 1, wherein the content of the C.I. Acid Red 52 in the ink composition is 0.04% to 0.1% by mass.

4. The ink composition according to claim 1, wherein the content of the C.I. Acid Red 92 in the ink composition is 0.4% to 1.2% by mass.

5. An ink jet recording method comprising:
   ejecting droplets of an ink composition; and
   making the droplets adhere to a recording medium so that printing can be performed,
   wherein the ink composition according to claim 1 is utilized.

6. An ink composition comprising:
   C.I. Acid Red 52;
   C.I. Acid Red 92;
   C.I. Direct Yellow 87; and
   a dye represented by the formula (I) below,
   wherein the ratio of the total content of the C.I. Acid Red 52, the C.I. Acid Red 92, and the C.I. Direct Yellow 87 to the content of the dye represented by the formula (I) above is 1:0.06 to 1:0.7,

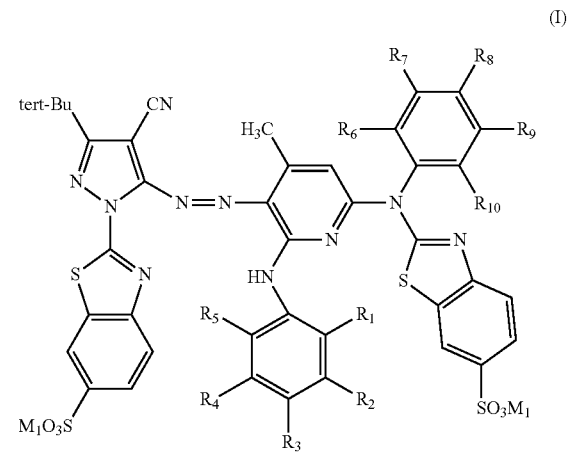

wherein $R_1$ to $R_{10}$ each represent a hydrogen atom, an alkyl group having 1 to 6 carbon atoms, a sulfo group, or a salt thereof;
in the case wherein $R_1$ to $R_5$ each independently represent an alkyl group, the total of the number of carbon atoms constituting the alkyl group of $R_1$ and the number of carbon atoms constituting the alkyl group of $R_5$ is 3 or more, and $R_1$ and $R_5$ each may have a substituent;
in the case wherein $R_6$ to $R_{10}$ each independently represent an alkyl group, the total of the number of carbon atoms constituting the alkyl group of $R_6$ and the number of carbon atoms constituting the alkyl group of $R_{10}$ is 3 or more, and $R_6$ and $R_{10}$ each may have a substituent; and
M represents a hydrogen atom or an alkali metal atom.

7. The ink composition according to claim 6, wherein the content of the dye represented by the formula (I) above in the ink composition is 0.2% to 2.0% by mass.

8. The ink composition according to claim 6, wherein the content of the C.I. Acid Red 52 in the ink composition is 0.04% to 0.1% by mass.

9. The ink composition according to claim 6, wherein the content of the C.I. Acid Red 92 in the ink composition is 0.4% to 1.2% by mass.

10. The ink composition according to claim 6, wherein the content of the C.I. Direct Yellow 87 in the ink composition is 2.4% to 4% by mass.

11. An ink jet recording method comprising:
   ejecting droplets of an ink composition; and
   making the droplets adhere to a recording medium so that printing can be performed,
   wherein the ink composition according to claim 6 is utilized.

* * * * *